US012673358B2

(12) United States Patent
Baccino et al.

(10) Patent No.: US 12,673,358 B2
(45) Date of Patent: Jul. 7, 2026

(54) MACHINE FOR FORMING RFID ANTENNAS

(71) Applicant: ABG SYSTEMS S.P.A., Lacchiarella (IT)

(72) Inventors: Simone Baccino, Lacchiarella (IT); Stefano Umili, Lacchiarella (IT)

(73) Assignee: ABG SYSTEMS S.P.A., Lacchiarella (IT)

( * ) Notice: Subject to any disclaimer, the term of this patent is extended or adjusted under 35 U.S.C. 154(b) by 344 days.

(21) Appl. No.: 18/293,563

(22) PCT Filed: Jul. 28, 2022

(86) PCT No.: PCT/IB2022/056983
§ 371 (c)(1),
(2) Date: Jan. 30, 2024

(87) PCT Pub. No.: WO2023/007416
PCT Pub. Date: Feb. 2, 2023

(65) Prior Publication Data

US 2025/0100044 A1 Mar. 27, 2025

(30) Foreign Application Priority Data

Jul. 30, 2021 (IT) ........................ 102021000020543

(51) Int. Cl.
*B21F 1/04* (2006.01)
*B21F 45/00* (2006.01)
(Continued)

(52) U.S. Cl.
CPC ................ *B21F 1/04* (2013.01); *B21F 45/00* (2013.01); *H01Q 1/2208* (2013.01); *H01Q 21/0087* (2013.01)

(58) Field of Classification Search
CPC .................................... B21F 1/04; B21F 3/00
See application file for complete search history.

(56) References Cited

U.S. PATENT DOCUMENTS

| | | | | |
|---|---|---|---|---|
| 5,062,288 A * | 11/1991 | Titzer | B21F 1/04 72/383 |
| 9,546,429 B1 * | 1/2017 | Dion | H01M 8/16 |
| 10,239,111 B2 * | 3/2019 | Knewtson | B21C 51/00 |

FOREIGN PATENT DOCUMENTS

| | | |
|---|---|---|
| EP | 3 154 328 A1 | 4/2017 |
| EP | 3 311 390 A1 | 4/2019 |
| WO | 2013/093826 A1 | 6/2013 |

OTHER PUBLICATIONS

International Search Report and Written Opinion dated Nov. 18, 2022 from corresponding International Patent Application No. PCT/IB2022/056983, 12 pages.

* cited by examiner

*Primary Examiner* — Matthew Katcoff
(74) *Attorney, Agent, or Firm* — Ruggiero McAllister & McMahon LLC

(57) ABSTRACT

A machine for forming RFID antennas includes a support structure provided with a support for an RFID substrate, and a plurality of forming pegs having vertical axes fixed with respect to the support and arranged above it to define a predetermined path for a wire configured to form the RFID antenna The machine has a wire feeding system that has a wire guide element and a handling assembly, a pair of grippers arranged at the ends of the path and operable to assume a closed position, in which the wire is blocked, and an open position, in which the wire is released, and a movable structure carried by the support structure and provided with a thrust element movable vertically between an upper position in which it allows the wire to be wound around the pegs and a lower position in which it deposits the formed antenna on the substrate.

13 Claims, 10 Drawing Sheets

(51) Int. Cl.

| | |
|---|---|
| *H01Q 1/22* | (2006.01) |
| *H01Q 21/00* | (2006.01) |

MACHINE FOR FORMING RFID ANTENNAS

CROSS-REFERENCE TO RELATED APPLICATIONS

This Patent Application is a national stage application filed under 35 U.S.C. § 371 of PCT Application No. PCT/IB2022/056983 filed on Jul. 28, 2022, which claims priority from Italian Patent Application No. 102021000020543 filed on Jul. 30, 2021, the entire disclosure of each of which is incorporated herein by reference.

BACKGROUND OF THE DISCLOSURE

1. Field of the Disclosure

The present disclosure relates to a machine for forming RFID antennas.

2. Description of Related Art

As is known, an RFID (Radio-Frequency IDentification) system comprises at least one RFID tag (or transponder), a reader for reading and/or writing data, and a data management information system for transferring the data to and from the reader. The identification and the exchange of information between RFID tag and reader occurs in radiofrequency.

The RFID tag comprises a microchip containing data in a memory, at least one antenna, and a physical support, called substrate, for keeping the microchip and the at least one antenna together.

The antenna receives a signal from the reader, said signal being transformed by means of the electromagnetic induction principle into electric energy, which can feed the microchip. By means of the antenna, the microchip communicates with the reader, which can read and/or write data on the RFID tag.

The antenna, made of a metal wire, typically has a shaped curvilinear shape. Therefore, an antenna with a relatively long length can be deposited on a substrate, for example adhesive tape, having a relatively reduced area.

EP3311390A1 illustrates a machine for forming RFID antennas wherein the wire is wound around a series of pegs carried by a forming device rotating in reciprocating motion.

To manufacture a machine which allows obtaining an antenna with a desired shape and depositing it on a substrate is a complex problem, as it is necessary to coordinate different operations, some of which must be carried out simultaneously and require an accurate synchronization. Furthermore, the use of a rotating forming device strongly limits the obtainable geometries of the antenna and has problems of dynamic nature.

The object of the present disclosure is to manufacture a machine for forming RFID antennas, which allows overcoming the aforementioned problems.

SUMMARY OF THE DISCLOSURE

The aforementioned object is achieved by a machine for forming RFID antennas having: a support structure provided with a support for an RFID substrate and a plurality of forming pegs having vertical axes fixed with respect to the support and arranged above the support to define a predetermined path for a wire configured to form the RFID antenna; a wire feeding system comprising a wire guide element and a handling assembly, configured to move the wire guide element along mutually orthogonal horizontal axes to wind the wire at least partially around the plurality of forming pegs and define the path; a pair of grippers arranged at ends of the path and operable to assume a closed position in which the wire is blocked and an open position in which the wire is released; and a movable structure carried by the support structure and provided with a thrust element movable vertically between an upper position in which the wire is allowed to be wound around the plurality of forming pegs and a lower position in which the formed antenna is deposited on the substrate . . .

BRIEF DESCRIPTION OF THE DRAWINGS

In order to better understand the present disclosure, a preferred embodiment is described in the following, by way of non-limiting example and with reference to the accompanying drawings.

DETAILED DESCRIPTION OF THE DISCLOSURE

Figure 1:
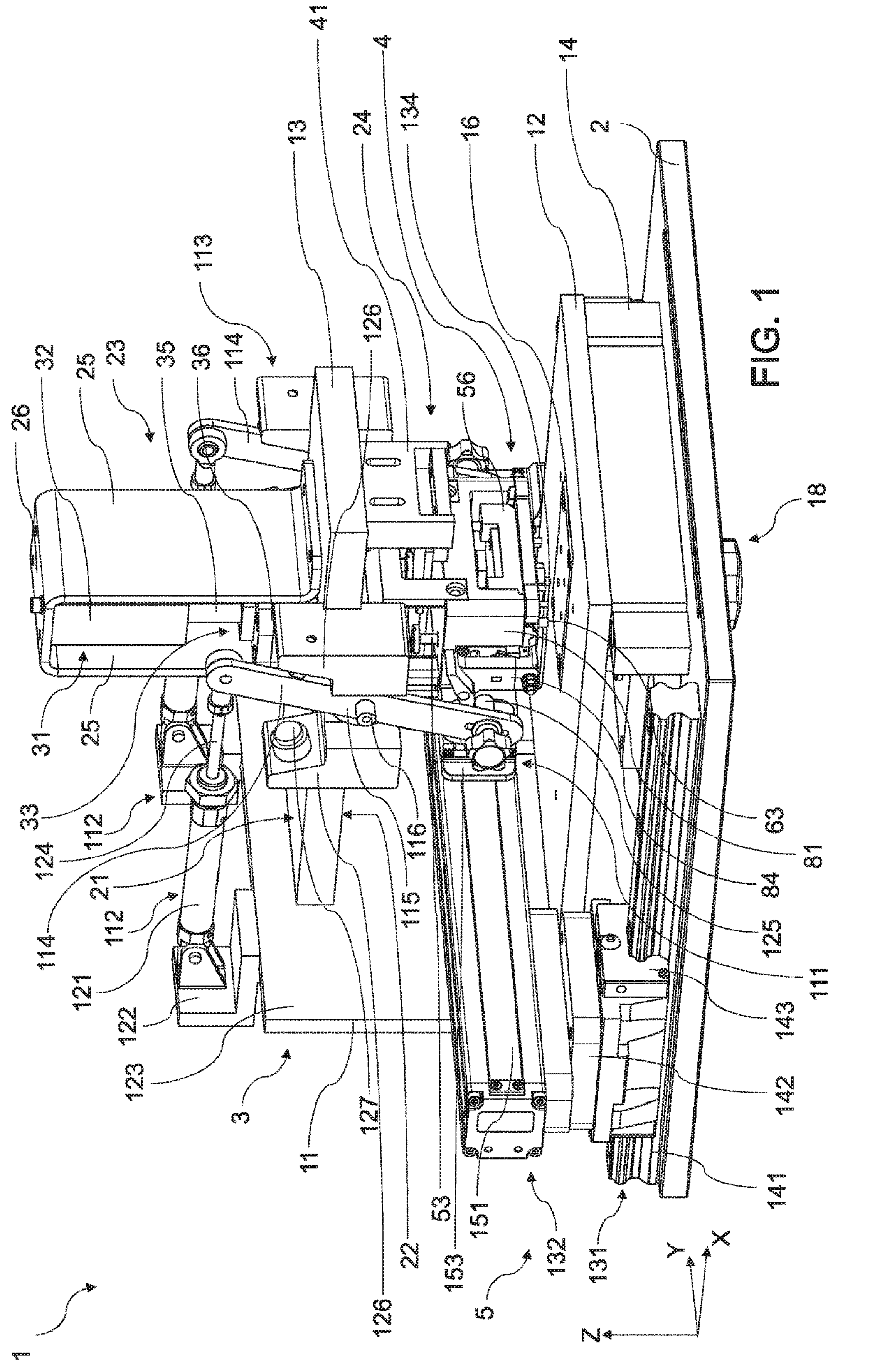
FIG. 1 is a perspective view of a machine according to the present disclosure.

With reference to FIG. 1, reference numeral 1 indicates a machine for forming RFID antennas according to the present disclosure.

The machine 1 comprises a horizontal base 2, a fixed structure 3 which extends vertically upward from the base 2, a movable structure 4 carried by the fixed structure 3, and a wire feeding system 5 for forming the antennas.

The base 2 is substantially a parallelepiped having main dimensions along two horizontal axes X and Y, orthogonal with respect to each other, and reduced height along a vertical axis Z. Preferably, the base 2 has, in a central portion thereof, a through cavity 6 with a substantially parallelepiped shape having main dimensions parallel to the axes X and Y.

The fixed structure 3 comprises a vertical wall 11, parallel to the axis Y and extending upward in the proximity of a corner of the base 2, a lower plane 12 and an upper plane 13 which are horizontal and extend cantilevered from the vertical wall 11 toward a central portion of the base 2. The lower plane 12 and the upper plane 13 substantially have the same dimension along the axis X, whereas the dimension along the axis Y of the lower plane 12 is greater than that of the upper plane 13, which is centred vertically with respect to the lower plane 12.

The lower plane 12 is supported by the base 2 by means of vertical supports 14 extending along respective sides of the lower plane 12 parallel to the axis Y. The lower plane 12 has, in a central portion thereof, a rectangular through cavity 15 having sides parallel to the axes X and Y, and centred vertically with respect to the cavity 6 of the base 2.

The cavity 15 houses with lateral clearance a horizontal plate 16 comprising an upper face 17 configured to slidingly support an adhesive tape (not illustrated), pitch-fed parallel to the axis X and defining a substrate for the antennas. The vertical position of the plate 16 can be adjusted by means of a screw system 18.

The upper plane 13 comprises an upper face 21 and a lower face 22. The fixed structure 3 comprises an upper support 23 coupled at the top to the upper face 21, and a lower support 24 coupled at the bottom to the lower face 22.

The upper support 23 of the fixed structure 3 substantially has an "upside down U" shape and comprises two vertical walls 25, parallel with respect to each other and to the axis Y, and an upper horizontal wall 26 joining respective upper sides of the walls 25, and defining a compartment 27 with them.

The wall 26 carries a vertical actuator 31 of axis A, extending below the wall 26 and inside the compartment 27.

The vertical actuator 31 is preferably a linear actuator comprising a fixed part 32, coupled at the top to the wall 26 of the upper support 23, and a movable part 33, comprising a shaft 34 of axis A and two movable guides 35 arranged on opposite sides of the shaft 34 along a plane parallel to the axis Y. The shaft 34 and the movable guides 35 are fixed at the bottom to a horizontal terminal plate 36. The movable guides 35 slidingly engage respective holes of the fixed part 32, with the aim to prevent a rotation of the shaft 34 and of the terminal plate 36 around the axis A. The terminal plate 36 of the vertical actuator 31 is coupled to the movable structure 4 of the machine 1, specifically described in the following.

The lower support 24 of the fixed structure 3 substantially has a "U" shape and comprises two vertical headpieces 41, extending at the bottom from the lower face 22 of the lower support 24, and a horizontal plate 42 carried by the headpieces 41 by means of respective brackets 43.

The headpieces 41, equidistant with respect to the axis A, are substantially parallelepipeds having respective inner faces 44 parallel to the axis Y and facing the axis A.

The brackets 43 substantially have an "upside down T" shape and each one comprises a vertical core 51 fixed to the inner face 44 of the respective headpiece 41 and a horizontal wing 52 on which the plate 42 rests.

The fixed structure 3 further comprises four screws 53 whose vertical axes are arranged at the vertexes of a horizontal rectangle having centre on the axis A.

Each screw 53 comprises a head 54 and a cylindrical stem 55. The distance between the stems 55 of the screws 53 facing each other in a direction parallel to the axis Y is substantially equal to the width of the plate 42 in such direction, so that the heads 54 of the screws 53 partially rest on the opposite edges of the plate 42 and the stems 55 rest laterally against such edges.

The fixed structure 3 further comprises a terminal structure 56 with a substantially parallelepiped shape at reduced height, provided with four upper vertical projections 57, in the proximity of the vertexes thereof, in which the stems 55 of the screws 53 are screwed.

The terminal structure 56 supports a central horizontal plate 61 from a lower face 62 of which a plurality of vertical pegs 63 extends at the bottom, passing through respective through-holes of the terminal structure 56.

The morphology and arrangement of the pegs 63 depend on the desired shape of the antenna. In particular, the pegs 63 are vertical cylinders having equal height but possibly a different diameter with respect to each other. The diameter and the positioning of the pegs 63 determine respectively the curvature and the position of the loops present in the curvilinear shape of the antenna.

In the illustrated example, the pegs 63 are seven and have symmetrical morphology and arrangement with respect to a vertical plane passing through the axis A and parallel to the axis X.

The pegs 63 are delimited at the bottom by base surfaces 64 facing and parallel to the upper face 17 of the plate 16, and vertically equidistant with respect to it.

It is worth mentioning that the pegs 63 are fixed and belong to the fixed structure 3 of the machine 1.

The movable structure 4 of the machine 1 comprises a thrust element 71 suspended from the terminal plate 36 of the vertical actuator 31 by means of cylindrical shafts 72, with vertical axis, mounted passing and slidable through respective holes of the upper plane 13.

The thrust element 71, vertically movable, comprises an upper structure 73 carried by the shafts 72, an intermediate structure 74 carried by the upper structure 73 and arranged below it, and a lower structure 75 carried by the intermediate structure 74 and arranged below it.

The upper structure 73 of the thrust element 71 comprises a horizontal plate 76 arranged above the plate 42 of the fixed structure 3, and four legs 77 extending downward in the proximity of the corners of the plate 76. The plate 76 is fixed at the top to the shafts 72. The legs 77 are fixed to the intermediate structure 74 and delimit with it and with the plate 76 a compartment 78 that houses the plate 42 and the heads 54 of the screws 53 of the fixed structure 3. Therefore, the upper structure 73 is movable downward until the plate 76 stops against the heads 54 of the screws 53.

The intermediate structure 74 of the thrust element 71 substantially has an "upside down U" shape and comprises two vertical walls 81, parallel to each other and to the axis X, and an upper horizontal wall 82 integrally connected to the walls 81 along sides thereof parallel to the axis X and defining a compartment 83 with them.

The walls 81 of the intermediate structure 74, equidistant with respect to the axis A, carry respective grippers 84.

Figure 2:
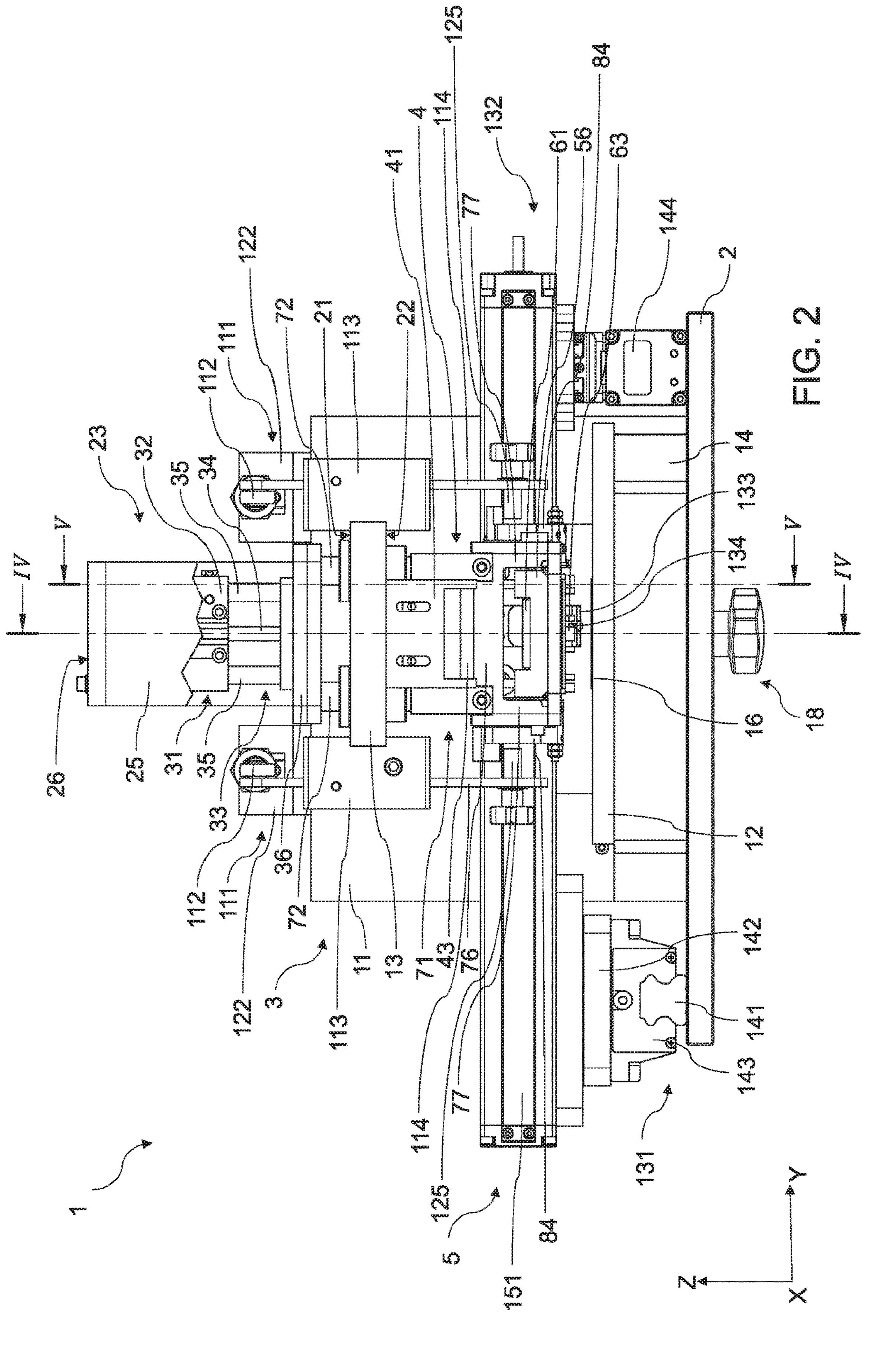
FIG. 2 is a front view of the machine of FIG. 1 with parts removed for clarity.
Figure 3:
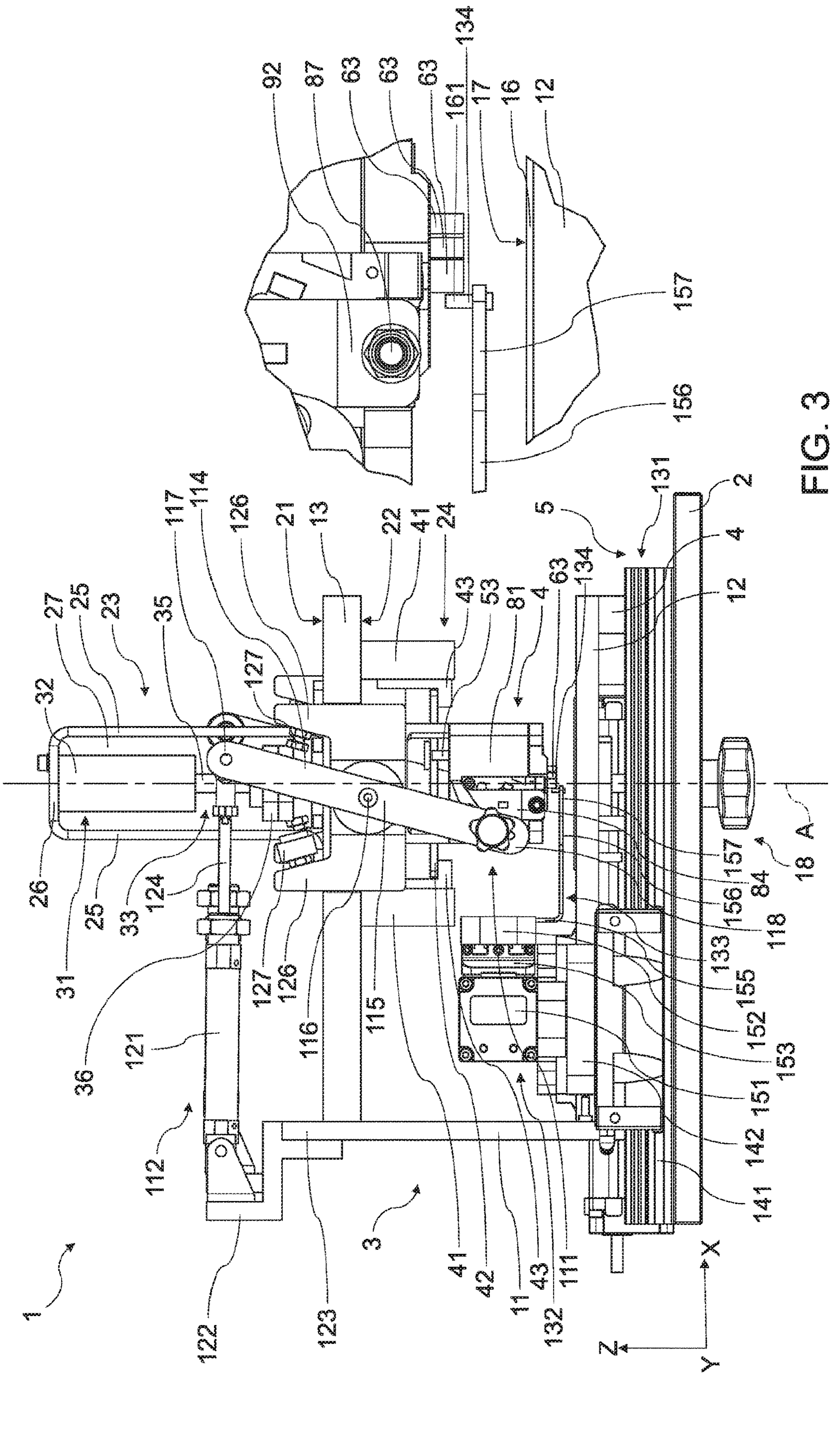
FIG. 3 is a side elevation view of the machine of FIG. 1, with an enlarged detail.
Figure 4:
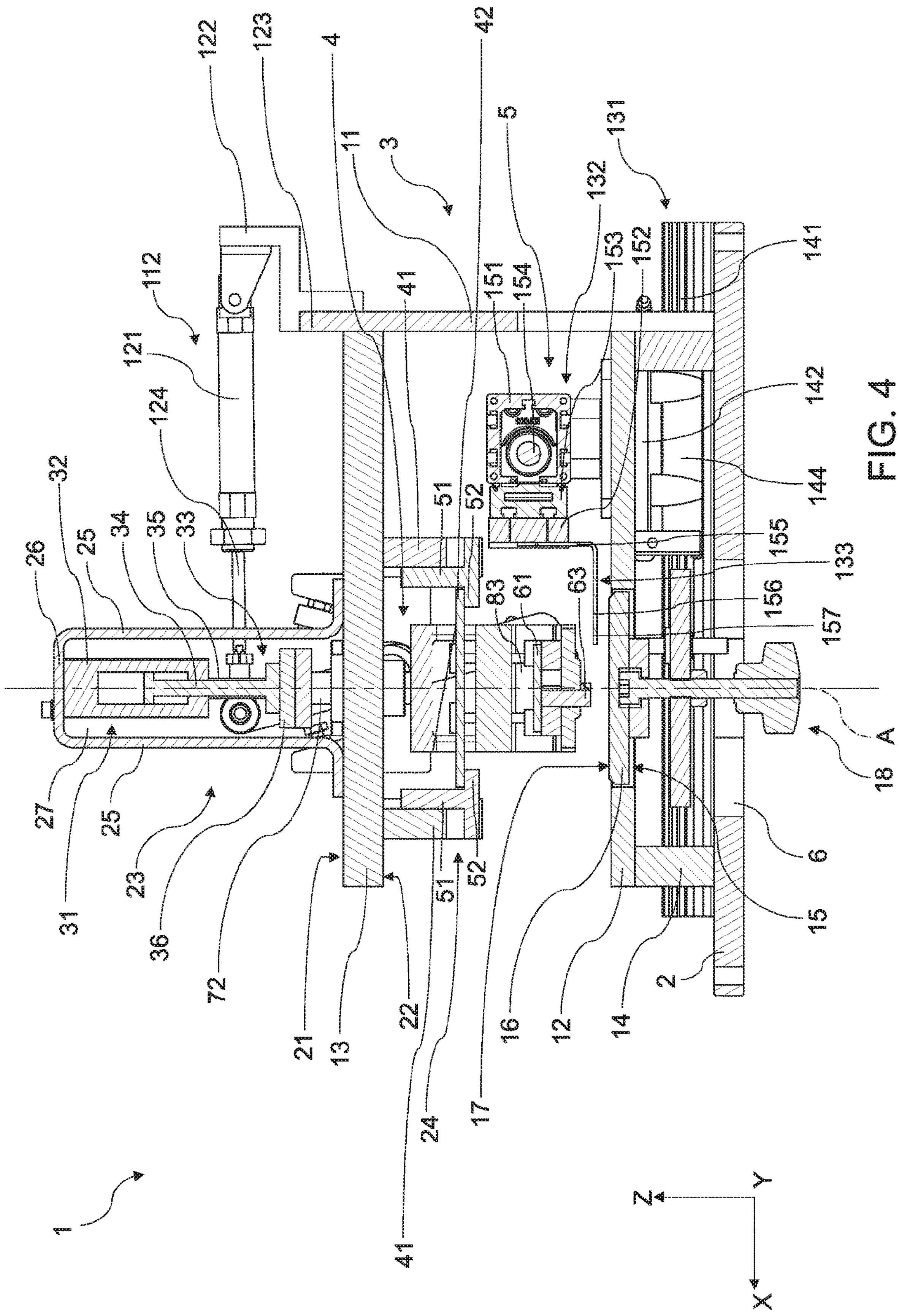
FIG. 4 is a vertical section according to line IV-IV in FIG. 2.
Figure 5:
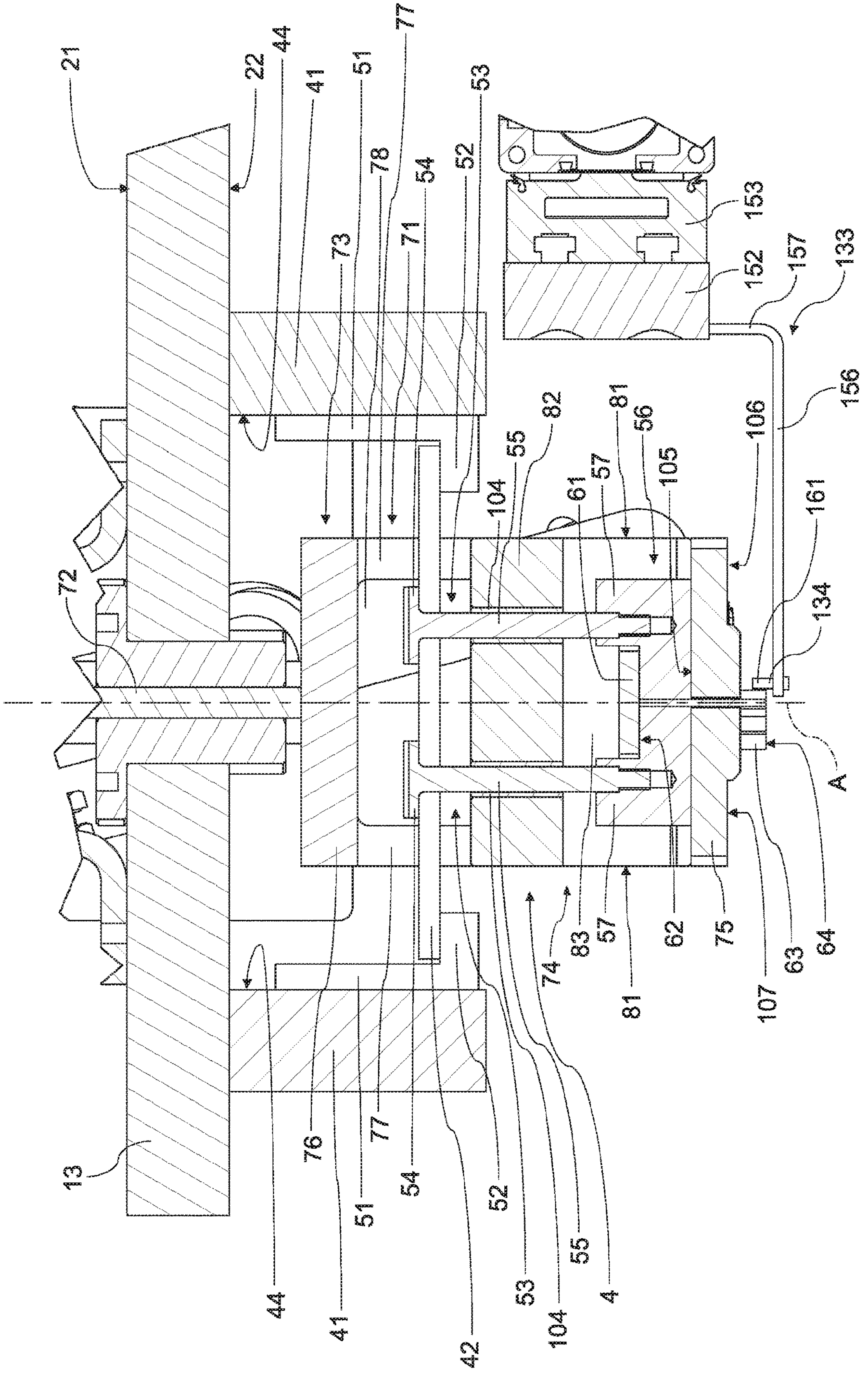
FIG. 5 is a partial section according to line V-V in FIG. 2 on an enlarged scale.

For convenience, the duplicated components, i.e. present both on the left and on the right (according to the front view of FIG. 2 of the machine 1) with respect to a vertical plane passing through the axis A and parallel to the axis X, are indicated with the suffix "a" and "b" after the reference numeral when it is necessary to make a distinction between the same. If the suffix is not used, the description refers without distinction to one or the other of the duplicated components.

Each gripper 84 comprises a fixed jaw 85 fixed to the wall 81 and a movable jaw 86 hinged to the fixed jaw 85 by means of a pin 87 having axis parallel to the axis Y.

Each fixed jaw 85 is fixed to the respective wall 81 and is substantially a vertical plate provided at the bottom with a through-hole for the pin 87 and with a beak 88 having a knurled gripping surface 89 extending along a plane parallel to the axis X and inclined downward and outward with respect to the fixed part 3 of the machine 1. Each fixed jaw

85 carries a blade 90, interposed between it and the fixed structure 3, comprising a surface inclined parallel to the gripping surface 89.

Each movable jaw 86 is coupled, in a rotatable manner, to the respective fixed jaw 85 on the opposite side with respect to the respective wall 81 and comprises an upper portion 91 and a lower portion 92.

The upper portion 91 of the movable jaw 86 substantially has a "T" shape and comprises a substantially vertical stem 93, parallel to the fixed jaw 85, and a crosspiece 94 extending cantilevered from the stem 93 in opposite direction with respect to the fixed part 3 and delimited at the bottom by a first lower face 95 and a second lower face 96 inclined and incident with respect to each other so as to substantially form a "V"-shaped profile.

The movable jaws 86*a*, 86*b* are identical to each other and are mounted rotated by 180 degrees around the axis Z with respect to each other. Therefore, the first lower face 95*a* of the movable jaw 86*a* is arranged toward the wall 11, whereas the first lower face 95*b* of the movable jaw 86*b* is arranged on the opposite side with respect to the wall 11. Similarly, the second lower face 96*a* of the movable jaw 86*a* is arranged on the opposite side with respect to the wall 11, whereas the second lower face 96*b* of the movable jaw 86*b* is arranged toward the wall 11.

The lower portion 92 of each movable jaw 86 is provided at the bottom with a through-hole for the pin 87 and with a beak 101, extending laterally cantilevered, having a knurled gripping surface 102 extending parallel to the gripping surface 89 of the fixed jaw 85 and facing it. Each movable jaw 86 carries a blade 103, coupled to the beak 101 and interposed between it and the fixed structure 3, comprising a surface inclined parallel to the gripping surface 102.

Figure 8:
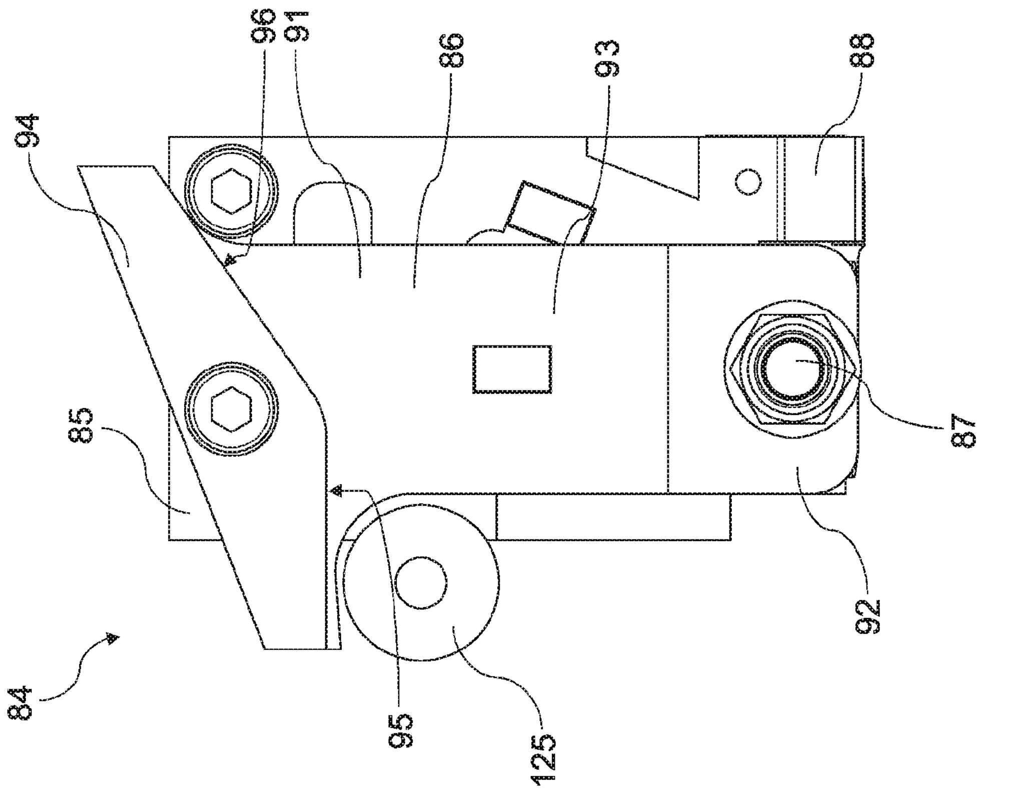
FIGS. 7 and 8 are side views of a component of the machine of FIG. 1 in different operating positions.
Figure 7:
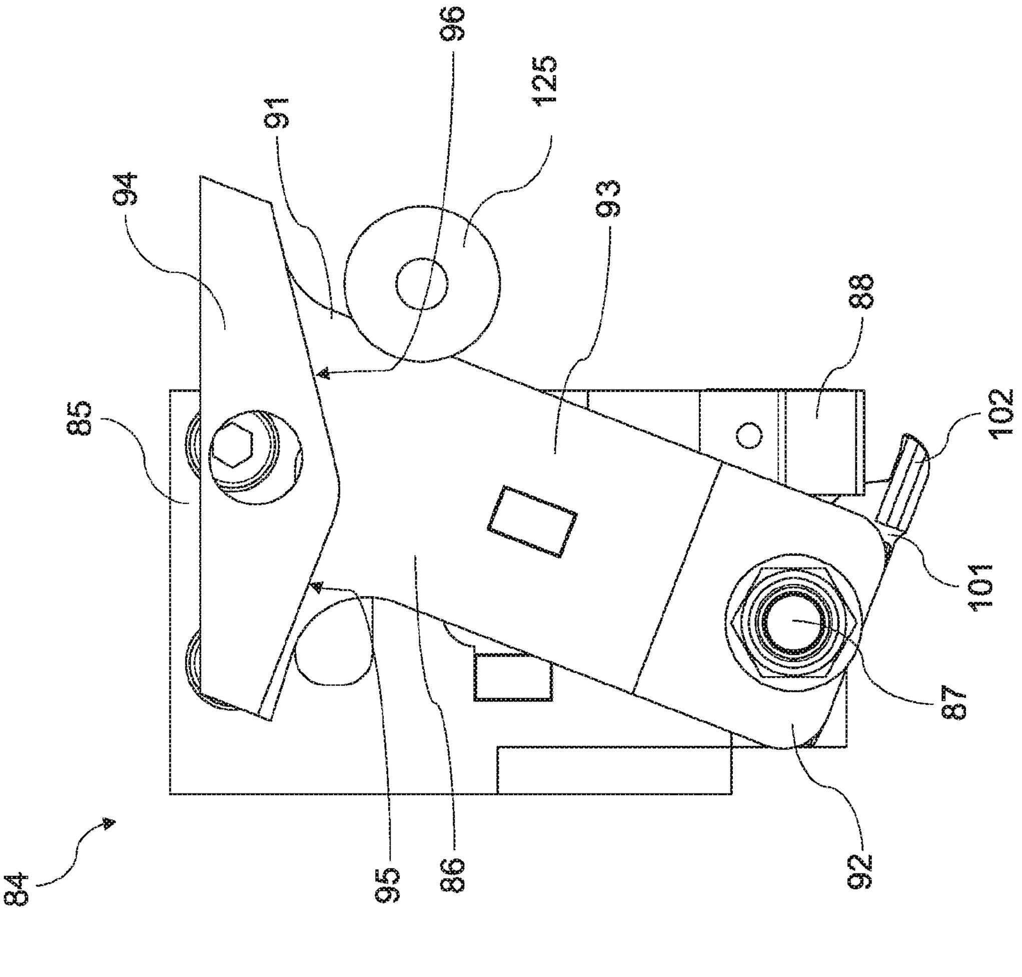
Figure 10:
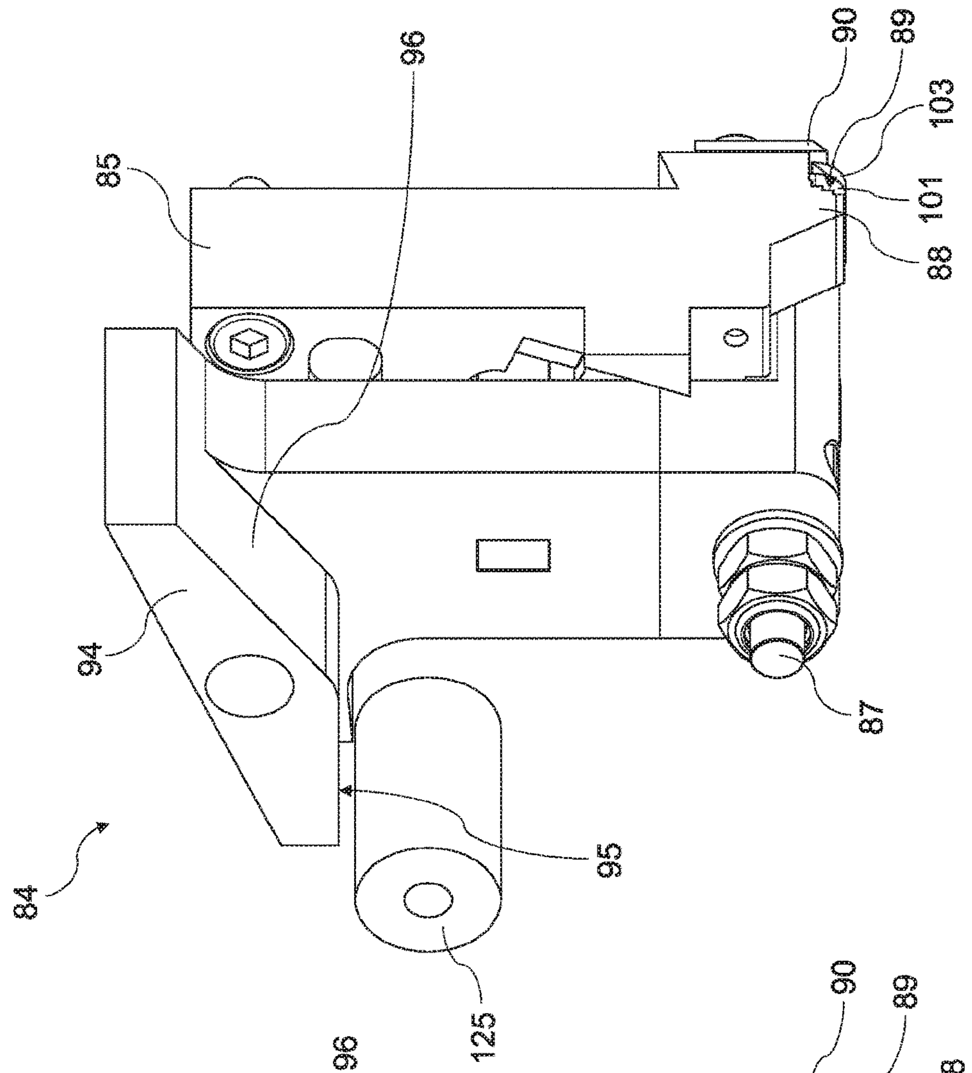
FIGS. 9 and 10 are perspective views corresponding to FIGS. 7 and 8.
Figure 9:
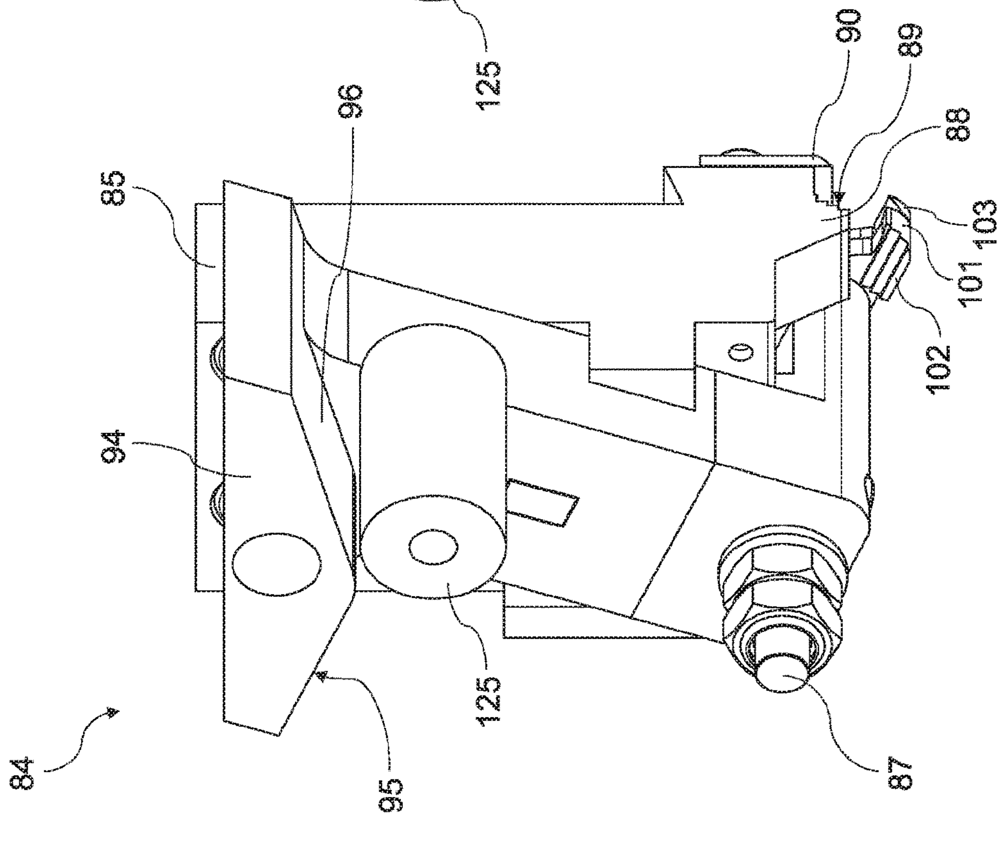

The movable jaws 86 are movable between an open position (FIGS. 7 and 9), in which the beak 101 is deviated from the beak 88 and the stem 93 is inclined, and a closed position (FIGS. 8 and 10), in which the gripping surfaces 102 and 89 of the beaks 101 and 88 substantially fit together for blocking the wire and the stem 93 is vertical.

The pins 87*a*, 87*b* of the grippers 84*a*, 84*b* are moved with respect to each other in the direction X so that the beaks 88*a*, 101*a* are aligned with the beaks 88*b*, 101*b* in a direction parallel to the axis Y in the closed position of the respective grippers 84*a*, 84*b*.

The wall 82 of the intermediate structure 74 has four through-holes provided with respective brushings 104 slidable on respective stems 55 of the fixed structure 3.

The lower structure 75 of the thrust element 71 is substantially a horizontal plate arranged below the terminal structure 56 of the fixed structure 3 and comprising an upper face 105 and a lower face 106. The upper face 105 has at the vertexes thereof respective horizontal projections coupled at the top to the intermediate structure 74. The lower face 106, parallel to the upper face 17 of the plate 16 and facing it, comprises a jig 107 that has a knurled surface. The lower structure 75 has through-holes for the respective pegs 63 of the fixed structure 3 of the machine 1.

The machine 1 further comprises two control assemblies 111 of the respective grippers 84, each of which comprises a linear actuator 112, a lateral support 113 fixed to a respective side of the upper plane 13, and a rod 114 hinged to the respective lateral support 113.

Each rod 114 comprises an intermediate portion 115 hinged to the respective lateral support 113 by means of a hinge 116 having axis parallel to axis Y, an upper end 117, and a lower end 118.

The linear actuators 112, preferably of pneumatic type, extend in a direction substantially parallel to the axis X and each one comprises a fixed part 121 hinged to a bracket 122 fixed to an upper end 123 of the wall 11, and a movable shaft 124 hinged to the upper end 117 of the rod 114.

At the lower end 118 of each rod 114 a stopping peg 125 with a cylindrical shape is fixed with axis parallel to the axis Y extending toward the respective gripper 84 below the crosspiece 94.

The position of the peg 125 can be preferably set in longitudinal direction with respect to the rod 114.

Each lateral support 113 further comprises two projections 126, extending parallel to the axis Y, comprising at the top respective end-of-strokes 127, facing each other, configured to interact with the rod 114 for defining the extreme angular positions of the rod.

Figure 12:
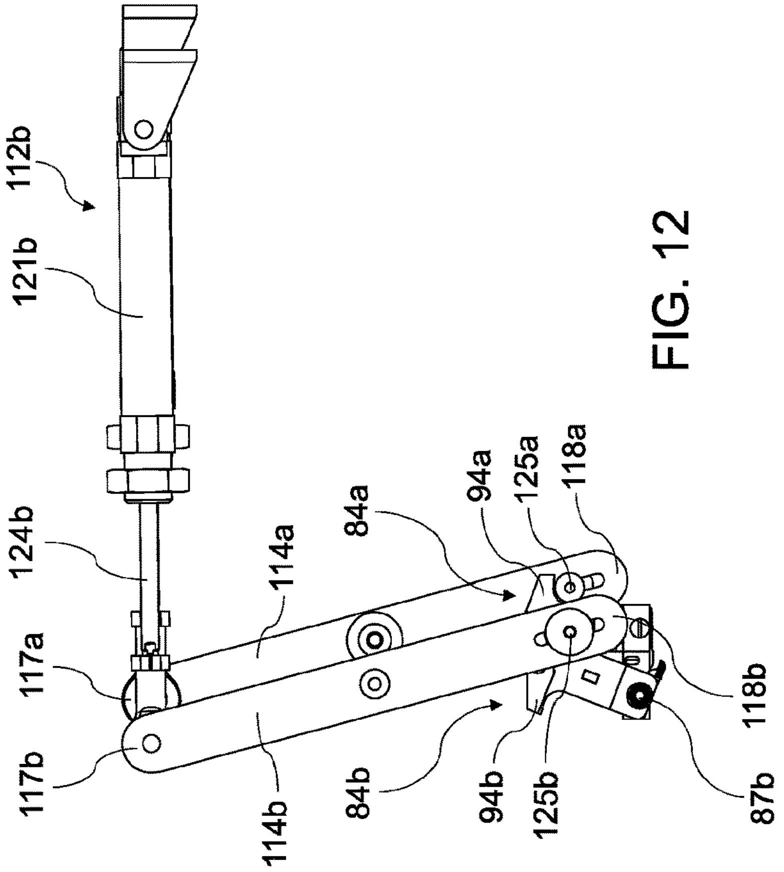
FIGS. 11 and 12 are side views on opposite sides of components of the machine of FIG. 1 in an operating position.
Figure 11:
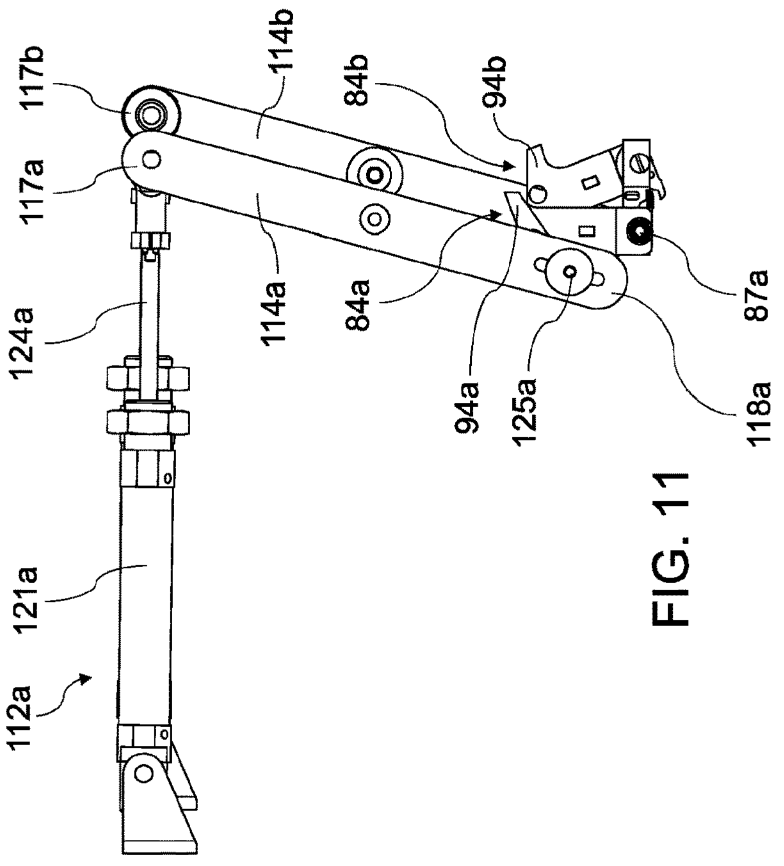
Figure 14:
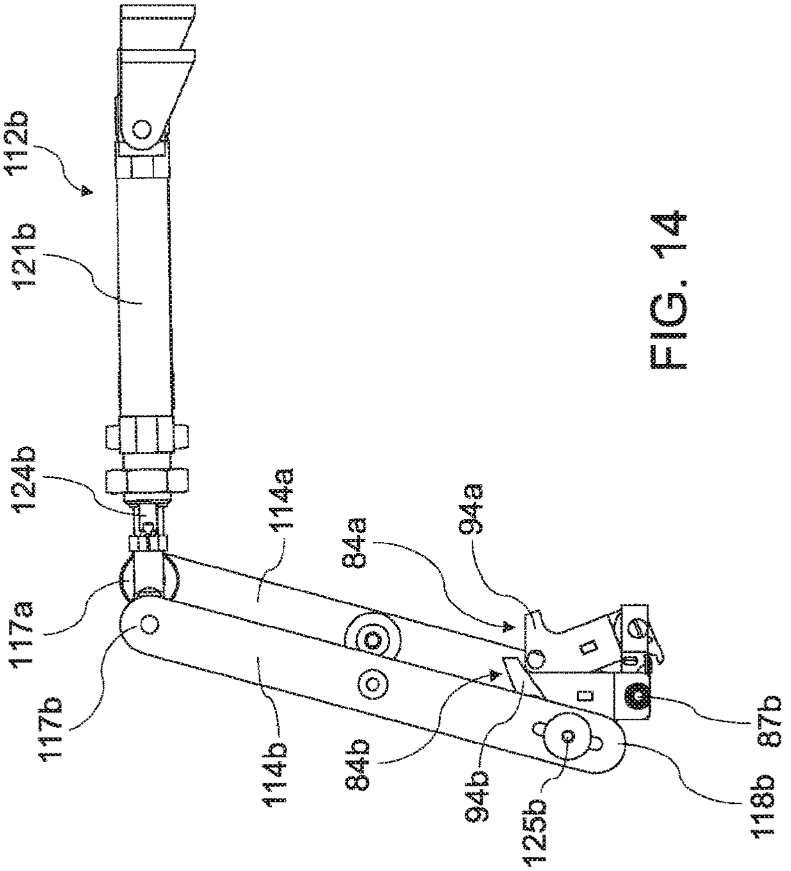
FIGS. 13 and 14 are side views on opposite sides of the components of FIGS. 11 and 12 in another operating position.
Figure 13:
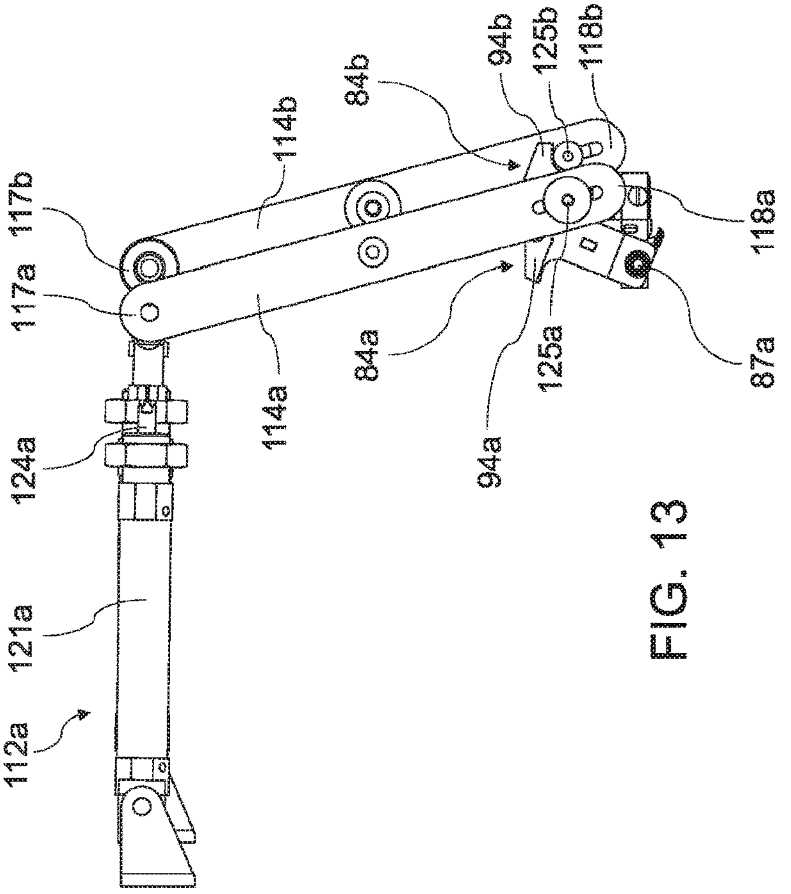

As is noticeable from the comparison between FIGS. 11 and 12 and between FIGS. 13 and 14, the control assemblies 111 are moved with respect to each other in the direction X of a quantity corresponding to the distance in the direction X between the axes of the pins 87.

In particular, in a first end-of-stroke position of the rod 114, corresponding to an extended position of the respective linear actuator 112 (FIGS. 11 and 12), the peg 125 is arranged below the first lower face 95 of the crosspiece 94 of the movable jaw 86 of the respective gripper 84, and in a second end-of-stroke position of the rod 114, corresponding to a retracted position of the respective linear actuator 112 (FIGS. 13 and 14), the peg 125 is arranged below the second lower face 96 of the crosspiece 94 of the movable jaw 86 of the respective gripper 84.

The feeding system 5 comprises a handling assembly comprising a movable assembly X 131 and a movable assembly Y 132 carried by the movable assembly X 131, and a terminal bracket 133 carried by the movable assembly Y and carrying a wire guide brushing 134.

The movable assembly X 131 comprises two guides X 141, parallel to the axis X and arranged along opposite sides of the base 2, and two carriages X 142 slidable on the respective guides X 141 by means of respective sliding blocks 143 and a linear motor 144 associated with one of the guides X 141. The carriages X 142 carry the movable assembly Y 132.

The movable assembly Y 132 comprises a guide Y 151, parallel to the axis Y and arranged at a greater height than the lower plane 12 and at a lower height than the wings 52 of the brackets 43, and a carriage Y 152 slidable on the guide Y 151, on the opposite side of the vertical wall 11 with respect to the guide Y 151, by means of sliding blocks 153 and a linear motor 154 associated with the guide Y 151.

The carriage Y 152 carries the bracket 133 substantially "L"-shaped and comprising a vertical arm 155, extending along the axis Z and coupled to the carriage Y 152, and a horizontal arm 156 extending along the axis X from a lower end of the vertical arm 155.

The horizontal arm 156 faces the thrust element 71 and is arranged at a greater height than the lower plane 12 and at a lower height than the base surfaces 64 of the respective pegs 63. The horizontal arm 156 has, at an end 157 thereof opposite with respect to the vertical arm 155, a hole passing through the wire guide brushing 134 with vertical axis.

An upper end 161 of the wire guide brushing 134 is arranged at a greater height than the base surfaces 64 of the pegs 63 and at a lower height than the lower face 106 of the lower structure 75 when the thrust element 71 is at its upper end-of-stroke.

The wire guide brushing 134 has two degrees of linear freedom, since it can be moved by the feeding system 5 along the axes X and Y.

The wire is wound into a coil (not illustrated) from which it unwinds for arriving below the horizontal arm 156 of the bracket 133 and passing through the wire guide brushing 134 from the bottom upward. The feeding system 5 comprises a wire tensioning device of known type and not illustrated.

In the following, two working cycles are described in detail corresponding to the forming of respective antennas. The described cycles are consecutive and can be repeated indefinitely.

The initial conditions of the first cycle (FIGS. 11 and 12) are the following:

- the thrust element 71 is at its upper end-of-stroke;
- the linear actuators 112*a*, 112*b* are extended, i.e. the shafts 124*a*, 124*b* come out of the respective fixed parts 121*a*, 121*b*, thus the rods 114*a*, 114*b* have the upper ends 117*a*, 117*b* at a greater distance from the vertical wall 11 of the fixed structure 3 with respect to the lower ends 118*a*, 118*b;*
- the gripper 84*a* is closed, whereas the gripper 84*b* is open;
- the peg 125*a* is arranged vertically below the first lower face 95*a* of the crosspiece 94*a* of the movable jaw 86*a* of the gripper 84*a*, and the peg 125*b* is arranged vertically below the second lower face 96*b* of the crosspiece 94*b* of the movable jaw 86*b* of the gripper 84*b;*
- the wire guide brushing 134 is on the left of the gripper 84*a*; and
- the wire exiting the wire guide brushing 134 is constrained at an end thereof to the gripper 84*a*, being maintained between the beaks 88*a* and 101*a* of the respective jaws 85*a* and 86*a*.

Initially, the wire is passed around the pegs 63 by the wire guide brushing 134 so as to obtain the desired shape of the antenna.

Figure 6:
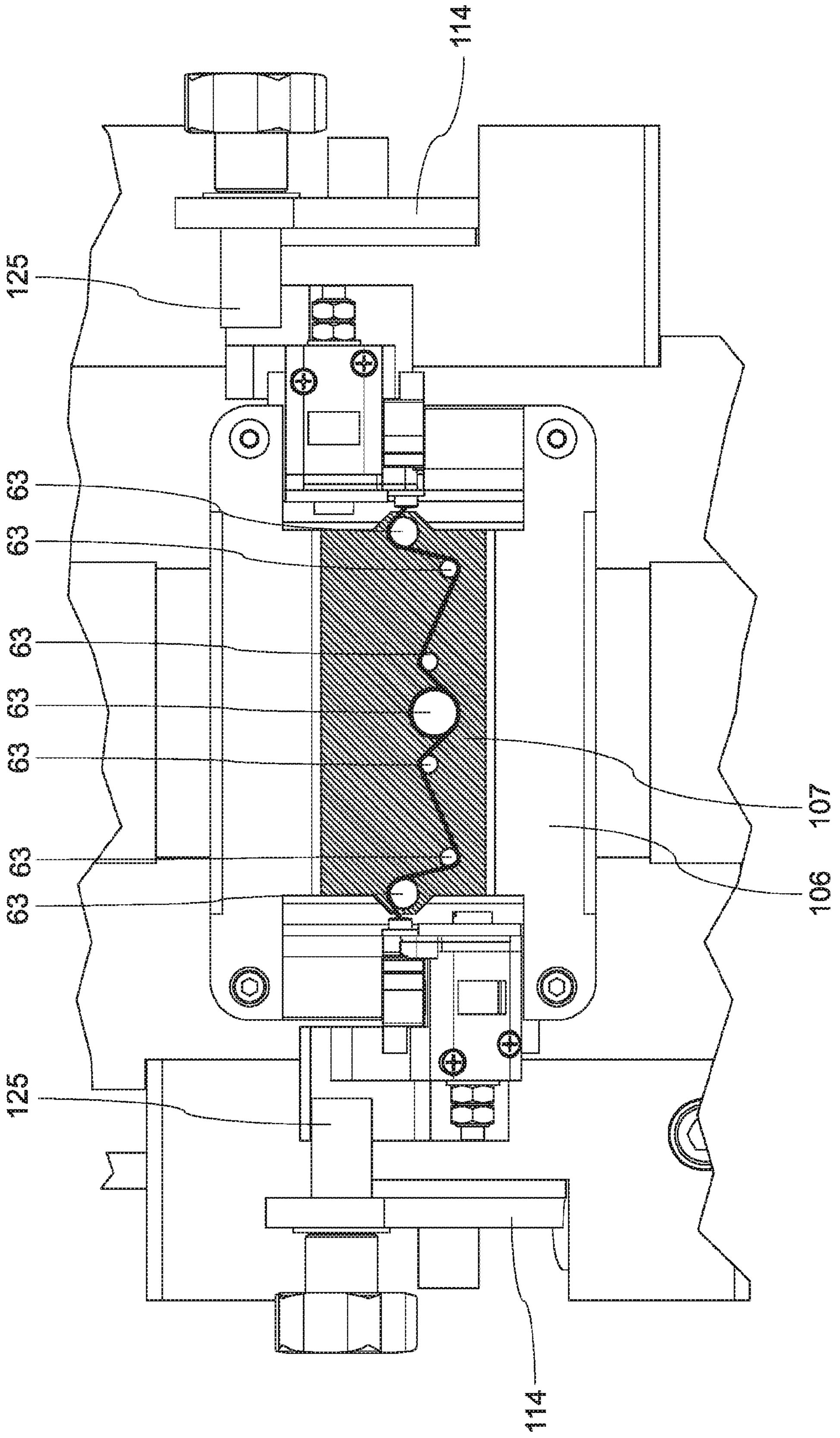
FIG. 6 is a bottom view of a detail of the machine of FIG. 1.

During this wire winding step, the wire guide brushing 134 is handled as a whole from left to right by the feeding system 5. In particular, the feeding system 5 modifies the coordinates of the wire guide brushing 134 along the axes X and Y so as to make the wire pass between the pegs 63 according to a predetermined path formed by rectilinear sections tangent to the pegs 63 alternated with curvilinear sections of partial or total winding around the pegs 63 (FIG. 6). Therefore, the diameter and the positioning of the pegs 63 determine respectively the curvature and the position of the loops present in the curvilinear shape of the antenna. When the wire guide brushing 134 is on the right of the beak 88*b* of the fixed jaw 85*b* of the gripper 84*b*, the feeding system 5 stops. In particular, since the gripper 84*b* is open, the wire passes through the beaks 88*b* and 101*b* of the respective jaws 85*b* and 86*b*. Therefore, the wire is held in tension by the gripper 84*a* which is closed, by the friction with the lateral walls of the pegs 63, and by the wire guide brushing 134.

Subsequently, the movable structure 4 of the machine 1 moves vertically. In particular, the vertical actuator 31 causes in rapid succession the downward descent and the upward ascent of the thrust element 71.

During the descent step of the thrust element 71, more operations occur simultaneously:

- the jig 107 of the lower structure 75 of the thrust element 71 moves downward, contacting the antenna and taking it downward, along the pegs 63 which are fixed. Therefore, the antenna is extracted from the pegs 63 and immediately deposited on the adhesive tape to which it adheres preserving its curvilinear shape. Since the jig 107 has a knurled surface, the risks of adhesion with the wire and/or the adhesive tape are minimised; and
- the grippers 84*a*, 84*b*, carried by the intermediate structure 74 of the thrust element 71, move downward for freeing the antenna that has just been formed, in particular:
  - the first lower face 95*a* of the crosspiece 94*a* of the movable jaw 86*a* of the gripper 84*a* abuts on the peg 125*a*, and the consequent rotation of the movable jaw 86*a* around the pin 87*a* entails the opening of the gripper 84*a* and the releasing of the end of the wire constrained to the gripper 84*a*; and
  - the second lower face 96*a* of the crosspiece 94*b* of the movable jaw 86*b* of the gripper 84*b* abuts on the peg 125*b*, and the consequent rotation of the movable jaw 86*b* around the pin 87*b* entails the cutting of the wire thanks to the drawing close of the blade 103*b* to the blade 90*b*, thus separating the antenna that has just been formed from the rest of the wire, and the closing of the gripper 84*b* on the free end of the wire.

During the ascent step of the thrust element 71, immediately subsequent to the descent step, more operations occur simultaneously:

- the adhesive tape slides parallel to the axis X on the upper face 17 of the plate 16, so as to have a new free surface of the tape on which to deposit a new antenna;
- the linear actuators 112*a*, 112*b* are retracted.

Alternatively, these operations can take place during the initial step of the second cycle, i.e. the wire winding step. In any case, these operations take place in masked time, i.e. parallel to other actions, thus they do not have an impact on the overall duration of the working cycle.

The initial conditions of the second cycle (FIGS. 13 and 14) are the following:

- the thrust element 71 is at its maximum upward deviation;
- the linear actuators 112*a*, 112*b* are retracted, i.e. the shafts 124*a*, 124*b* re-enter the respective fixed parts 121*a*, 121*b*, thus the rods 114*a*, 114*b* have the upper ends 117*a*, 117*b* at a less distance from the vertical wall 11 of the fixed structure 3 with respect to the lower ends 118*a*, 118*b;*
- the gripper 84*a* is open, whereas the gripper 84*b* is closed;
- the peg 125*a* is arranged vertically below the second lower face 96*a* of the crosspiece 94*a* of the movable jaw 86*a* of the gripper 84*a*, and the peg 125*b* is arranged vertically below the first lower face 95*b* of the crosspiece 94*b* of the movable jaw 86*b* of the gripper 84*b;*
- the wire guide brushing 134 is on the right of the gripper 84*b;*
- the wire exiting the upper end 161 of the wire guide brushing 134 is constrained at an end thereof to the gripper 84*b*, being maintained between the beaks 88*b* and 101*b* of the respective jaws 85*b* and 86*b*.

Initially, the wire passes again around the pegs 63 so as to obtain the desired shape of the antenna.

During this wire winding step, the wire guide brushing 134 is handled as a whole from right to left by the feeding system 5, in a dual manner with respect to what described in the corresponding step of the first cycle.

Subsequently, the movable structure 4 of the machine 1 moves vertically. In particular, the vertical actuator 31 causes in rapid succession the downward descent and the upward ascent of the thrust element 71.

During the descent step of the thrust element 71, the same operations of the corresponding step of the first cycle occur simultaneously, mutatis mutandis. In particular, the gripper 84*a* closes and cuts the wire separating the antenna that has just been formed, and the gripper 84*b* opens.

During the ascent step of the thrust element 71, immediately subsequent to the descent step, more operations occur simultaneously:

the adhesive tape slides parallel to the axis X on the upper face 17 of the plate 16, so as to have a new free surface of the tape on which to deposit a new antenna;

the linear actuators 112*a*, 112*b* are extended.

Alternatively, in similar manner to what said above, these operations can take place during the initial step of an immediately subsequent cycle.

The initial conditions of the cycle immediately subsequent to the second one coincide with the initial conditions of the first cycle. Therefore, the two described cycles can be applied repetitively in a sequence of arbitrary length.

By examining the characteristics of the machine 1, the advantages of the present disclosure are evident.

In particular, the wire winding step, during which the desired shape of the antenna is obtained, is carried out exclusively by the feeding assembly 5 which moves the wire guide brushing 134 according to a predetermined path, and does not require any handling of other elements. Therefore, the forming of the antenna is very simple and is not subjected to the shape limitations connected to the use of a rotating forming device. Furthermore, since this step does not entail the handling of remarkable masses, dynamic problems are prevented.

The remaining steps necessary for obtaining the antenna deposited on the adhesive tape simply occur by means of a vertical handling of the thrust element 71. In particular, the descent step of the thrust element 71 allows simultaneously obtaining the releasing of an end of the wire, the cutting and the contextual releasing of the other end of the wire, and the depositing of the antenna on the adhesive tape. Since this synchronization is due to mechanical interactions, it is exempt from errors and delays that could arise by controlling the operations singularly.

The other operations necessary for the continuous functioning of the machine 1 are carried out in masked time, i.e. parallel to other actions, thus do not have an impact on the overall duration of the working cycle.

Finally, it is clear that modifications and variations can be made to the machine 1 without departing from the scope of protection defined by the claims.

For example, the control assembly 111 could be made in a different manner. In particular, the commutation of the grippers 84 can be controlled by varying the position of the pegs 125 by means of actuators and/or kinematisms of different nature.

Furthermore, the grippers 84 could be made in a different manner and in particular symmetrically with respect to a middle longitudinal plane of the machine 1, thus requiring an operation in counterphase of the linear actuators 112.

Furthermore, the handling assembly of the feeding system 5 of the wire could be of polar type instead of Cartesian.

The invention claimed is:

1. A machine for forming RFID antennas, comprising:

a support structure provided with a support for an RFID substrate, and a plurality of forming pegs having vertical axes fixed with respect to the support and arranged above the support to define a predetermined path for a wire configured to form the RFID antenna;

a wire feeding system comprising a wire guide element and a handling assembly, configured to move the wire guide element along mutually orthogonal horizontal axes to wind the wire at least partially around the plurality of forming pegs and define the path;

a pair of grippers arranged at ends of the path and operable to assume a closed position, in which the wire is blocked, and an open position, in which the wire is released; and a movable structure carried by the support structure and provided with a thrust element movable vertically between an upper position in which the wire is allowed to be wound around the plurality of forming pegs and a lower position in which the formed antenna is deposited on the substrate.

2. The machine as claimed in claim 1, wherein the support structure is fixed.

3. The machine as claimed in claim 1, wherein the handling assembly comprises a first assembly movable along a first axis and a second assembly movable along a second axis and carried by the first movable assembly, wherein the wire guide element is carried by the second movable assembly.

4. The machine as claimed in claim 1, wherein the movable structure comprises a jig facing the support for the substrate and provided with a plurality of through-holes for respective pegs of the plurality of forming pegs.

5. The machine as claimed in claim 4, wherein the jig has a knurled surface.

6. The machine as claimed in claim 1, comprising means for adjusting a distance between the support and the plurality of forming pegs.

7. The machine as claimed in claim 1, wherein each gripper of the pair of grippers comprises a fixed jaw rigidly coupled to the movable structure, and a movable jaw rotatably coupled to a respective fixed jaw.

8. The machine as claimed in claim 7, wherein each fixed jaw carries a first blade, and each movable jaw carries a second blade, the first blade and the second blade being configured to cooperate with each other and cut a portion of the wire when a relative gripper of the pair of grippers moves from the open position to the closed position.

9. The machine as claimed in claim 7, further comprising two control assemblies configured to simultaneously arrange one gripper of the pair of grippers in the open position and another one of the pair of grippers in the closed position.

10. The machine as claimed in claim 9, wherein each control assembly comprises an abutment element configured to interact with the movable jaw of a respective gripper of the pair of grippers to modify a position thereof from closed to open or vice versa during a downward stroke of the movable structure.

11. The machine as claimed in claim 10, wherein the two control assemblies comprise a kinematism for moving the abutment element between a position that determines an opening of the respective gripper and a position that determines a closing of the respective gripper.

12. The machine as claimed in claim 11, wherein each control assembly comprises:

a rod centrally hinged to the support structure and having an upper end and a lower end carrying the abutment element; and a linear actuator interposed between the upper end and the support structure.

13. The machine as claimed in claim 12, wherein the movable jaw of each gripper comprises a stem hinged to the movable structure and a crosspiece provided with a pair of lower surfaces inclined to each other in a “V” shape, the abutment element being a peg configured to interact with either of the lower surfaces.

* * * * *